(12) United States Patent
Froman

(10) Patent No.: US 7,926,763 B2
(45) Date of Patent: Apr. 19, 2011

(54) ICE MANAGEMENT SYSTEM FOR ROTARY-WING AIRCRAFT

(75) Inventor: Gary S. Froman, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 794 days.

(21) Appl. No.: 11/913,520

(22) PCT Filed: May 16, 2005

(86) PCT No.: PCT/US2005/017022
§ 371 (c)(1),
(2), (4) Date: Nov. 2, 2007

(87) PCT Pub. No.: WO2006/124026
PCT Pub. Date: Nov. 23, 2006

(65) Prior Publication Data
US 2008/0152494 A1 Jun. 26, 2008

(51) Int. Cl.
*B64D 15/12* (2006.01)
(52) U.S. Cl. .................. 244/134 D; 244/134 A; 416/95
(58) Field of Classification Search .............. 244/134 D, 244/134 A; 416/95, 96 A; 219/482, 486, 219/497, 483
See application file for complete search history.

(56) References Cited

U.S. PATENT DOCUMENTS

| 3,657,514 | A | | 4/1972 | Adams | |
|---|---|---|---|---|---|
| 4,292,502 | A | * | 9/1981 | Adams | 219/483 |
| 4,410,794 | A | * | 10/1983 | Williams | 219/486 |
| 4,895,322 | A | * | 1/1990 | Zieve | 244/134 R |
| 5,737,210 | A | * | 4/1998 | Barahia | 363/144 |
| 6,427,946 | B1 | * | 8/2002 | Petrenko | 244/134 R |
| 6,753,513 | B2 | * | 6/2004 | Goldberg et al. | 219/497 |
| 7,604,202 | B2 | * | 10/2009 | Froman et al. | 244/134 D |
| 2007/0284480 | A1 | * | 12/2007 | Atkey et al. | 244/135 R |
| 2009/0230239 | A1 | * | 9/2009 | Stothers | 244/58 |

FOREIGN PATENT DOCUMENTS

CA 1128486 7/1982

OTHER PUBLICATIONS

CN Office Action, Oct. 10, 2009.
English Translation of CN Application, Oct. 9, 2009.
Canadian Office Action from CA counterpart Application No. 2,597,483, issued by the Canadian Intellectual Property Office on Oct. 28, 2010.

* cited by examiner

*Primary Examiner* — Christopher P Ellis
(74) *Attorney, Agent, or Firm* — James E. Walton; Richard G. Eldredge

(57) ABSTRACT

An ice management system is configured for an aircraft having at least one rotor (11), each rotor having a plurality of blades. The system has an alternating current (AC) electrical power supply for supplying AC power (13), the AC power supply being adapted to be carried by the aircraft remote from the rotor (11). A converter converts the AC power to direct-current (DC) power. At least one ice protection device is carried by the rotor and operated using the DC power.

13 Claims, 8 Drawing Sheets

ICE MANAGEMENT SYSTEM FOR ROTARY-WING AIRCRAFT

TECHNICAL FIELD

The present invention relates generally to the field of ice management systems and relates particularly to ice management systems for rotary-wing aircraft.

DESCRIPTION OF THE PRIOR ART

While ice management systems have used on various fixed-wing aircraft for many years, few ice management systems for rotary-wing aircraft, such as helicopters and tiltrotors, have been disclosed. Typically, helicopters are not equipped with ice protection devices, such as de-ice and/or anti-ice components, due to their weight, complexity, and/or cost. In addition, some types of ice management components, such as inflatable boots, are inappropriate for use on helicopters. Most helicopters are simply not flown during icing conditions.

For the existing or proposed systems, the effectiveness, size, and weight are the primary concerns. An ice management system must effectively prevent ice buildup on the main rotor to allow sufficient lift to be created for flight of the aircraft and prevent buildup on the tail rotor to allow for proper directional control of the aircraft. Some considerations include whether to prevent ice from forming, such as with an anti-ice system, or to cause and manage shedding of ice that has already formed, such as with a de-ice system. However, generating and controlling the delivery of electrical power to the ice management systems must be done with concern for the size and weight of components. Every additional component takes up space that could alternatively be used for other equipment required for flight, leading to reduced cabin size or increased size of the aircraft. The weight of the ice management system also must be kept to a minimum to allow for greater available payload capacity of the aircraft.

Due to considerations of weight and complexity, ice management systems for rotary-wing aircraft that have been disclosed typically use 3-phase alternating-current (AC) power. On rotors with 3 blades, the distribution of 3-phase power is simplified because one phase can be supplied to each blade in a "Y" load configuration or two phases can be supplied in a delta load configuration, and the loads on the 3-phase generator is balanced because the loads are symmetrical.

However, systems using this type of power are not easily adapted to rotors having a number of blades that is not a multiple of 3. For example, in providing 3-phase power to a helicopter with 5 rotor blades, one phase per rotor blade in a "Y" load configuration introduces a load imbalance because 5 is not an even multiple of 3, and the same problem exists when providing two phases in the case of a delta load configuration. This causes a load imbalance for the AC generator which is not desirable in modern generating systems.

SUMMARY OF THE INVENTION

It is one objective of the present invention to provide an ice management system for a rotary-wing aircraft, the system being configured for use with rotors having any number of blades.

The above objects are achieved by providing an ice management system for a rotary-wing aircraft, the system being configured for use with rotors having any number of blades.

An ice management system for a rotary-wing aircraft has computer-based processors for controlling the operation of heating elements located on the blades of at least one rotor of the aircraft. Power distributors controlled by the processors comprise non-parasitic current transformers to monitor the amount of 3-phase alternating current (AC) supplied, solid-state AC relays, an AC-to-direct current (DC) bridge rectifier for converting the 3-phase AC power to a single-voltage DC supply, and DC switching elements for selecting which heating elements to energize. The AC relays are preferably of a type that produces low levels of electromagnetic interference (EMI) when switching, such as through zero-cross switching. The DC power is supplied to the rotor through a slip-ring. AC power is supplied from two generators, allowing for switching of the power supply to an alternate generator in the event of a generator failure. The AC relays and DC switches provide redundant capability to stop current flow to the heating elements.

The present invention provides an ice management system with many advantages, including: (1) reduced complexity; (2) a balanced 3-phase AC load; (3) the ability to use low-cost components; (4) low levels of EMI; (5) compact size; (6) low weight; and (7) increased reliability.

Additional objectives, features, and advantages will be apparent in the written description that follows.

BRIEF DESCRIPTION OF THE DRAWINGS

For a more complete understanding of the present invention, including its features and advantages, reference is now made to the detailed description of the invention taken in conjunction with the accompanying drawings in which like numerals identify like parts, and in which.

DESCRIPTION OF THE PREFERRED EMBODIMENT

The present invention is an ice management system for rotary-wing aircraft, having a 3-phase alternating-current (AC) power generation system. The system is especially useful on aircraft having at least one rotor with a number of blades that is not a multiple of 3, including both main and tail rotors of helicopters and prop-rotors of tiltrotor aircraft.

The system incorporates ice protection devices, such as anti-ice and/or de-ice components, carried by the blades of the rotors, and these devices may include electro-thermal heating elements, parting strips, and/or other appropriate devices located in selected areas of the blades. Three-phase AC generators are a good means of supplying electric power for use on-board the aircraft because the generators have reduced size and complexity compared to a direct-current (DC) generator system. The system of the invention overcomes the problems inherent in using 3-phase AC power with a rotor having a number of blades that is not a multiple of three by converting the AC power to DC power and conducting the DC power to the rotor through a slip-ring or similar connection. The system provides also provides for switching within the rotor of anti-ice and de-ice components, simplifying the slip-ring connection.

Figure 1:
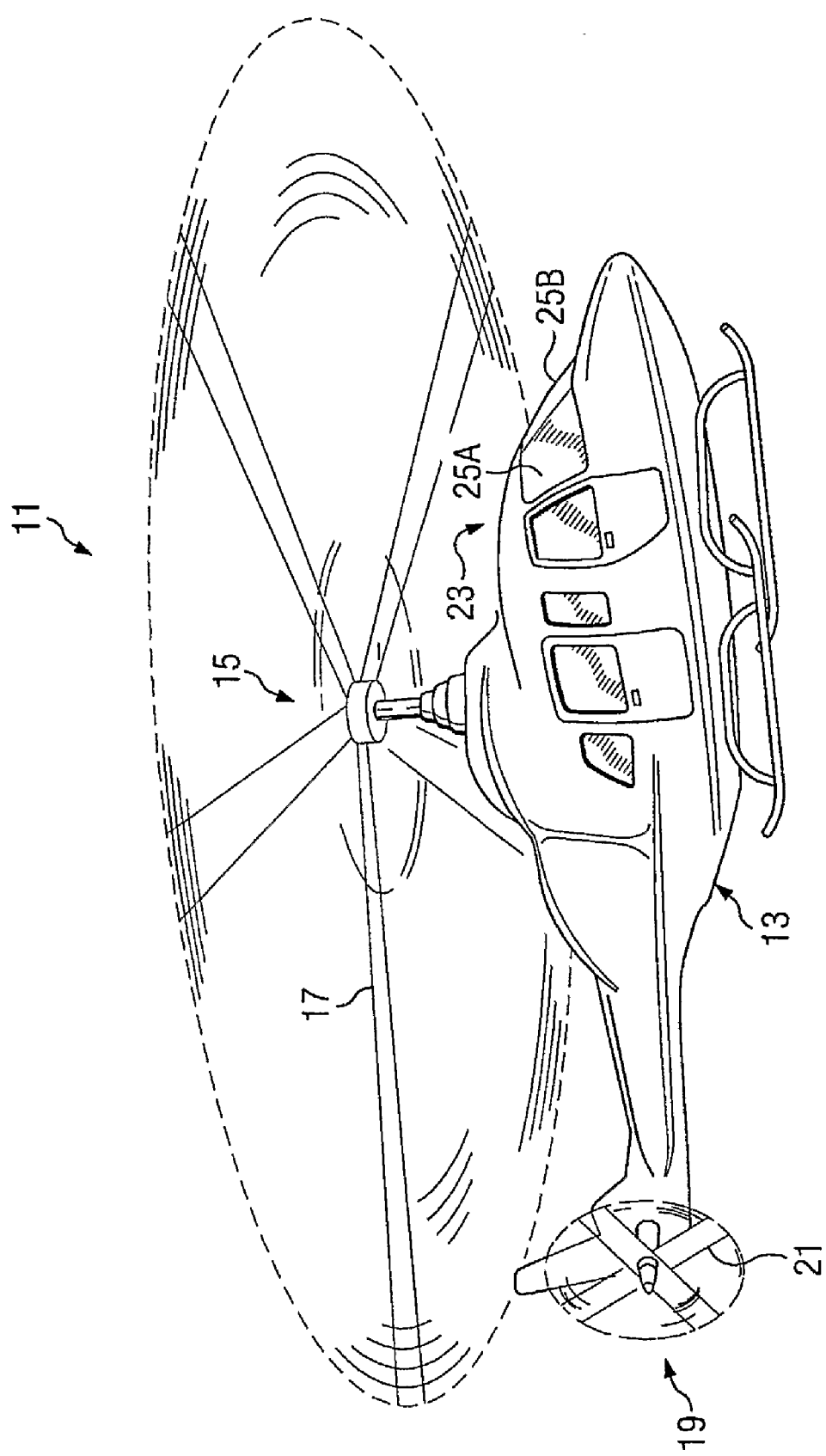
FIG. 1 is a perspective view of a rotary-wing aircraft having an ice management system according to the present invention.

FIG. 1 shows a rotary-wing aircraft, helicopter 11, equipped with an ice-management system according to the present invention. While a helicopter is shown in the figures, it should be understood that the system of the invention may be used on any type of rotary-wing aircraft, such as a tiltrotor aircraft. Helicopter 11 has a fuselage 13, a main rotor 15 with five rotor blades 17, and a tail rotor 19 with four blades 21. A cockpit 23 is located in a forward area of fuselage 13, and cockpit 23 has windshields 25A, 25B for the pilot and co-pilot, respectively.

Figure 2:
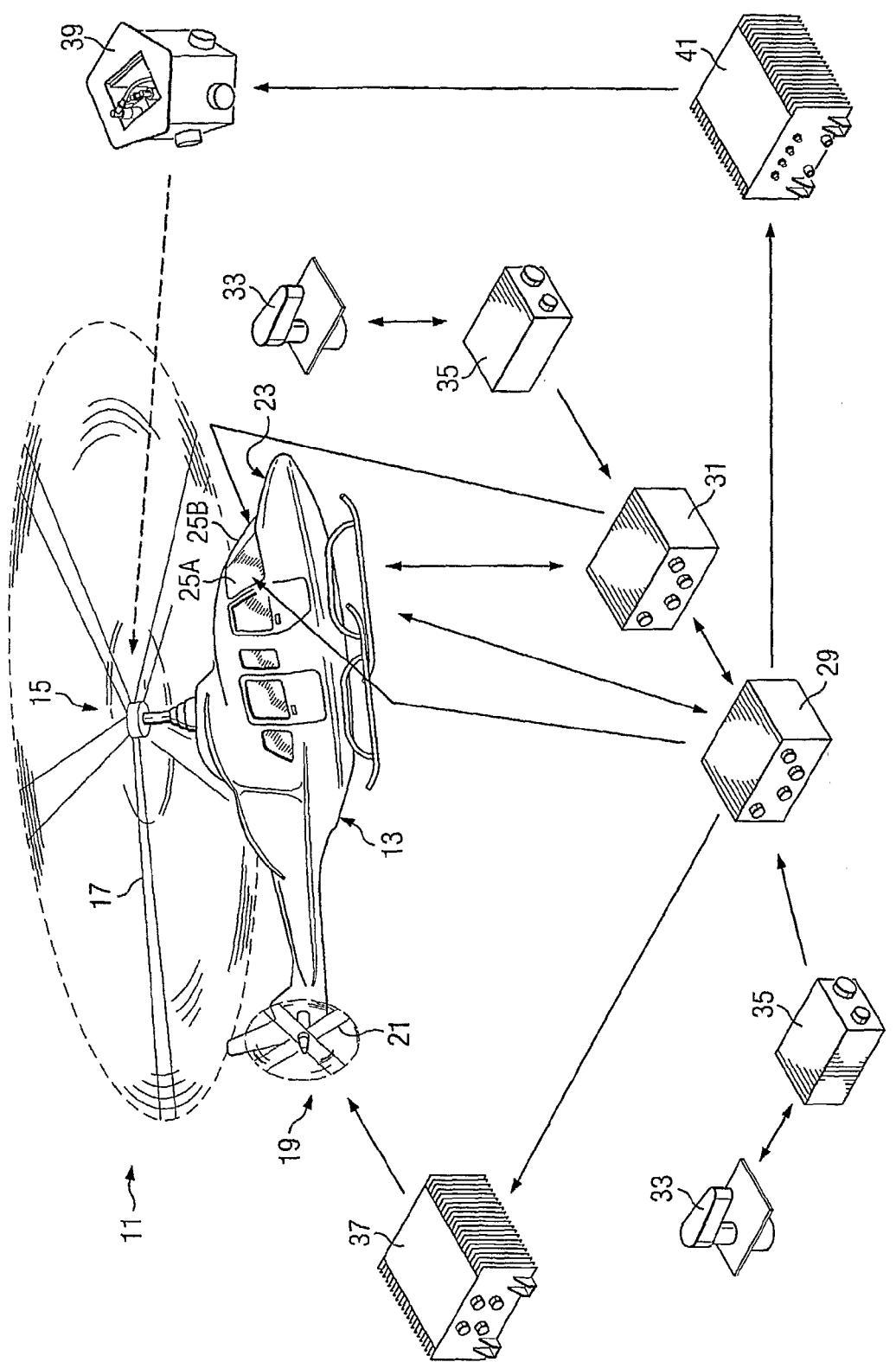
FIG. 2 is a schematic view of components of an ice management system according to the present invention.

FIG. 2 shows components of the ice management system 27 and the direction of communication between the components. System 27 comprises two computer-based processors 29, 31 controlled by the aircraft crew through a control panel (not shown) that is located in cockpit 23. Each processor 29, 31 is independent of the other, and each is capable of controlling the devices on rotors 13, 17 and one windshield 25A, 25B. In the preferred configuration, processors 29, 31 communicate with each other to compare readings and provide for control over some or all of the components of system 27, allowing for redundant control of components in the event of failure of one of processors 29, 31. Each processor 29, 31 is operatively connected to an ice detector 33 through a detector controller 35, and these cooperate to provide to processors 29, 31 detection of icing conditions and calculation of liquid water content of the ambient air during flight.

Processor 29 is operatively connected to a tail-rotor anti-ice distributor (TAD) 37 for controlling distribution of electrical power to electro-thermal anti-ice devices (not shown) in blades 21 of tail rotor 19. Anti-ice devices, which maintain a temperature that inhibits ice formation, are preferably used on tail rotor 19 to prevent ice formation on blades 21, as ice shed from tail rotor 19 may pass through the plane of main rotor 15 and impact blades 17. TAD 37 is conductively connected to the anti-ice devices on tail rotor 19 through a slip-ring carried on rotor 19. Processor 29 also controls de-ice devices (not shown) that provide for de-icing of pilot windshield 25A.

Processor 29 is also operatively connected to an upper de-ice distributor (UDD) 39 through a lower de-ice distributor (LDD) 41, UDD 39 and LDD 41 cooperating to control distribution of electrical power to electro-thermal de-ice devices on blades 17 of main rotor 15. UDD 39 is carried by main rotor 15, and the broken line in the figure indicates the installed location of UDD 39. UDD 39 is mounted in a position and orientation within the central portion of main rotor 15, such that UDD 39 is generally coaxial with rotor 15. UDD 39 and LDD 41 are conductively connected to each other through a slip-ring carried on rotor 15.

The preferred configuration is for processor 31 to control de-ice devices (not shown) that provide for de-icing of co-pilot windshield 25B and to act as a monitor and backup for processor 29. In this capacity, processor 31 monitors the current passing through ice management devices on rotors 15, 19 and monitors the "on" and "off" times commanded by processor 31. In the preferred embodiment, processor 29 self-monitors its performance and will pass control of system 27 to processor 31 and send an error message a display in cockpit 23 if processor 29 determines that it is commanding operation of the devices in a manner that deviates from the desired manner. Likewise, processor 31 will send an error message to the cockpit display if it determines processor 29 is not operating in the expected manner.

Figure 3:
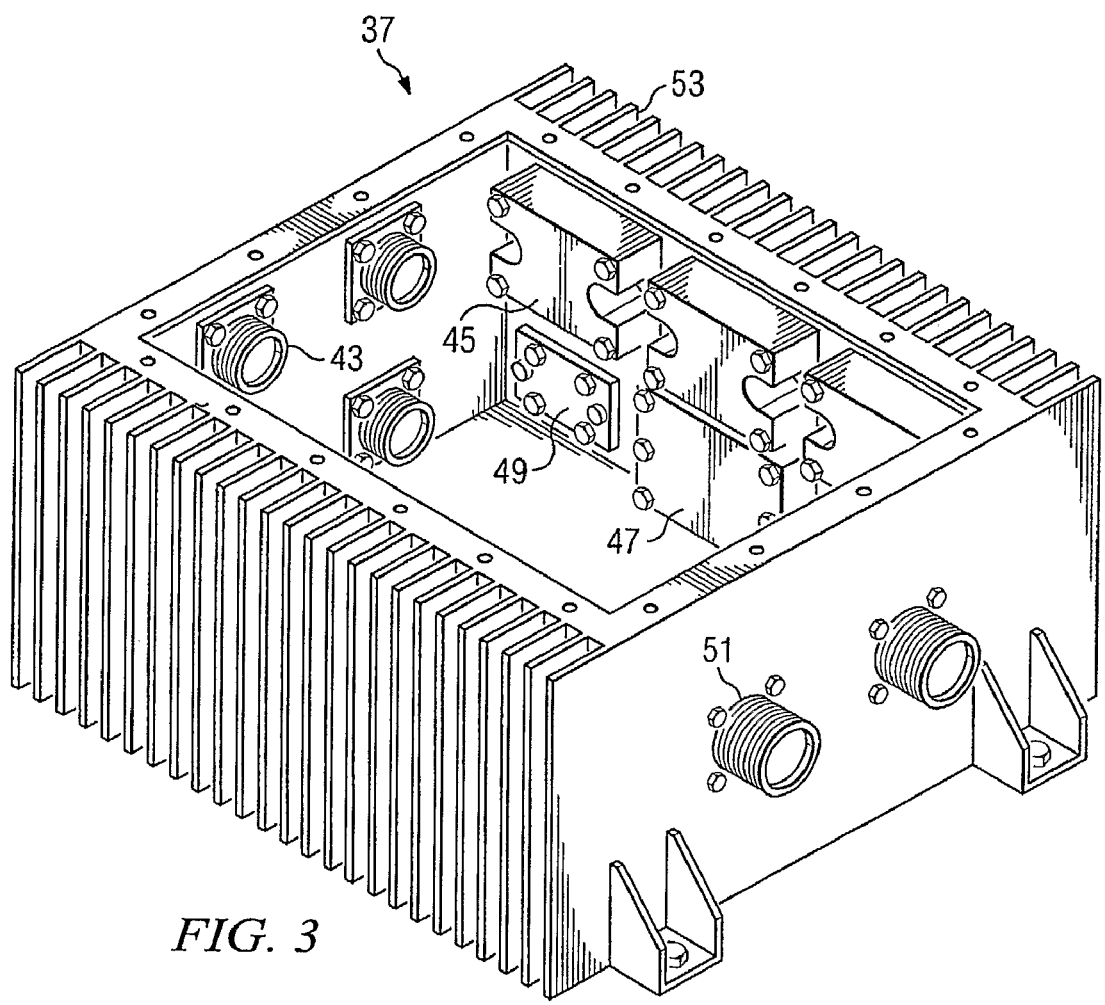
FIG. 3 is a perspective view of tail-rotor anti-ice distributor for use in the system according to the present invention.

FIG. 3 is a perspective view of TAD 37, an upper cover having been removed to allow viewing of the interior of TAD 37. As described more fully below, helicopter 11 is preferably configured with two 3-phase AC generators that provide power on separate busses. Each of the electrical busses is conductively connected through input connectors 43 to a set of internal components, each set being configured to convert and switch the electrical power from one of the busses. Each set of components comprises three solid-state relays 45 (one for each AC phase), a bridge rectifier 47 for converting the 3-phase AC power to DC power, and a high-capacity insulated-gate bipolar transistor (IGBT) 49, or similar switch, for providing redundant switching for the DC power output from rectifier 47. The DC power is then output from TAD 37 through output connectors 51. In the preferred embodiment, each bus provides power to only one opposing pair of blades of a four-bladed tail rotor when in the nominal configuration, though more or fewer blades may be connected to a bus. To minimize emission of electromagnetic interference (EMI) and reduce stress on components of system 27, relays 45 are preferably of a type that incorporates zero-cross switching, such that relays 45 switch only when the wave-form of the electrical power crosses zero, indicating no current flow. Switching of relays 45 and IGBTs 49 is controlled by processors 29, 31. Rectifiers 47 preferably have no voltage step, which would require heavy transformers, leading to increased weight of rectifiers 47. Cooling fins 53 are located on the chassis of TAD 37 for dissipating the heat energy from the internal components.

Figure 4:
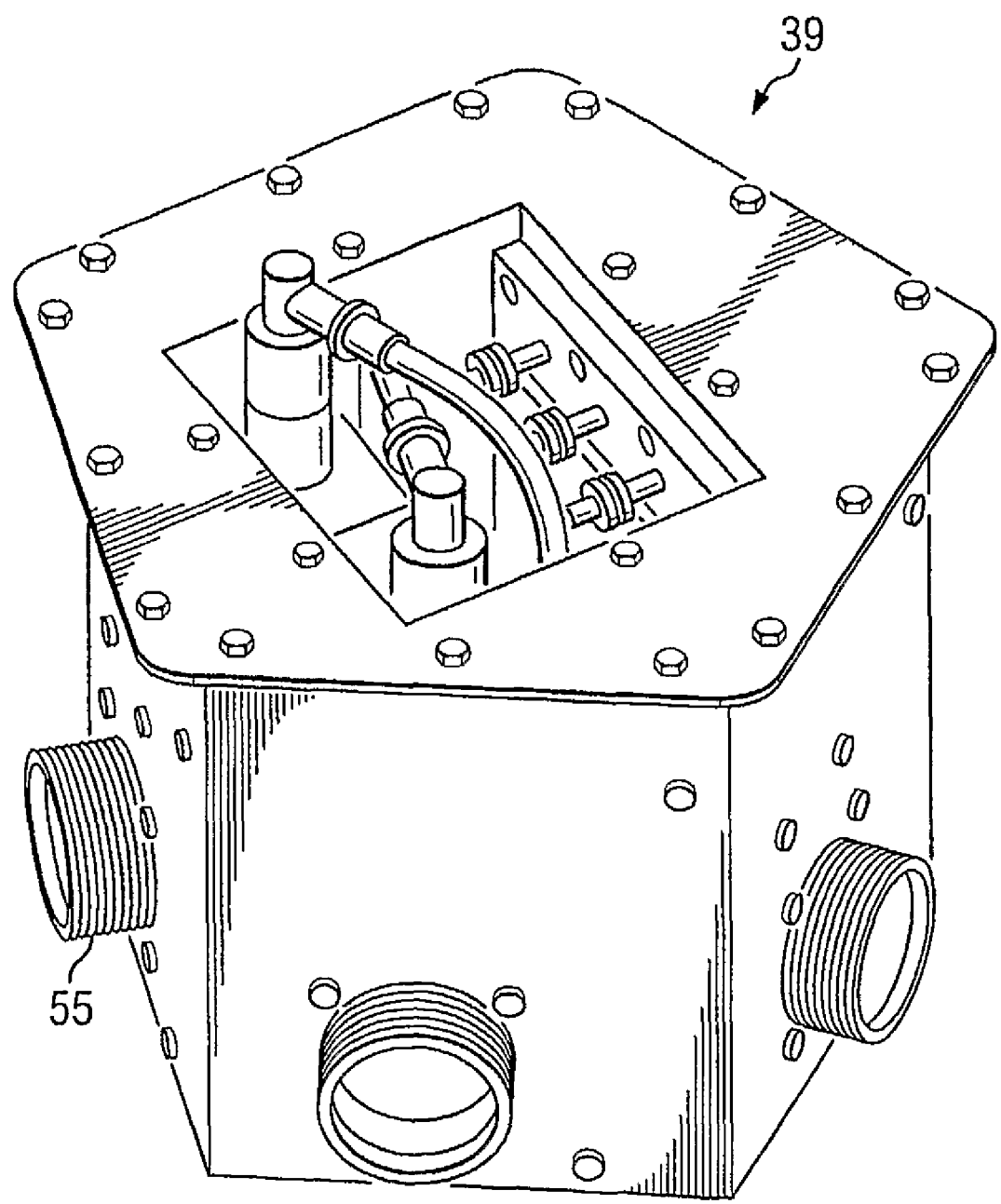
FIG. 4 is a perspective view of an upper de-ice distributor for use in the system according to the present invention.

Referring now to FIG. 4, UDD 39 has five blade connectors 55, each connector 55 for operatively connecting UDD 39 to one blade 17 of rotor 15. As will be discussed below, UDD 39 comprises high-capacity IGBTs (not shown), each IGBT being configured for switching the same heating zone for all blades simultaneously. Therefore, UDD 39 contains the same number of IGBTs as the number of heating zones on a single blade 17. For example, if there are eight heating zones on each blade 17, there will be eight IGBTs within UDD 39. Preferably, the heating zones are divided into a set of critical zones and a set of non-critical zones, each set being nominally connected to one of the busses. As described below, the preferred embodiment also allows for selective operation of only the critical zones when desired, such as when a limited amount of electrical power is available to operate the heating elements. Switching of the IGBTs is controlled by processor 29 or processor 31.

UDD 39, as shown in the figures configured for rotor 15 having five blades 17, has a pentagonal shape in plan view with a blade connector 55 located on each side of UDD 39. However, the shape of UDD 39 would likely be different for rotors having a different number of blades. For example, a UDD for a four-bladed rotor would likely have a square shape in plan view, a blade connector being located on each side of the UDD.

Figure 5:
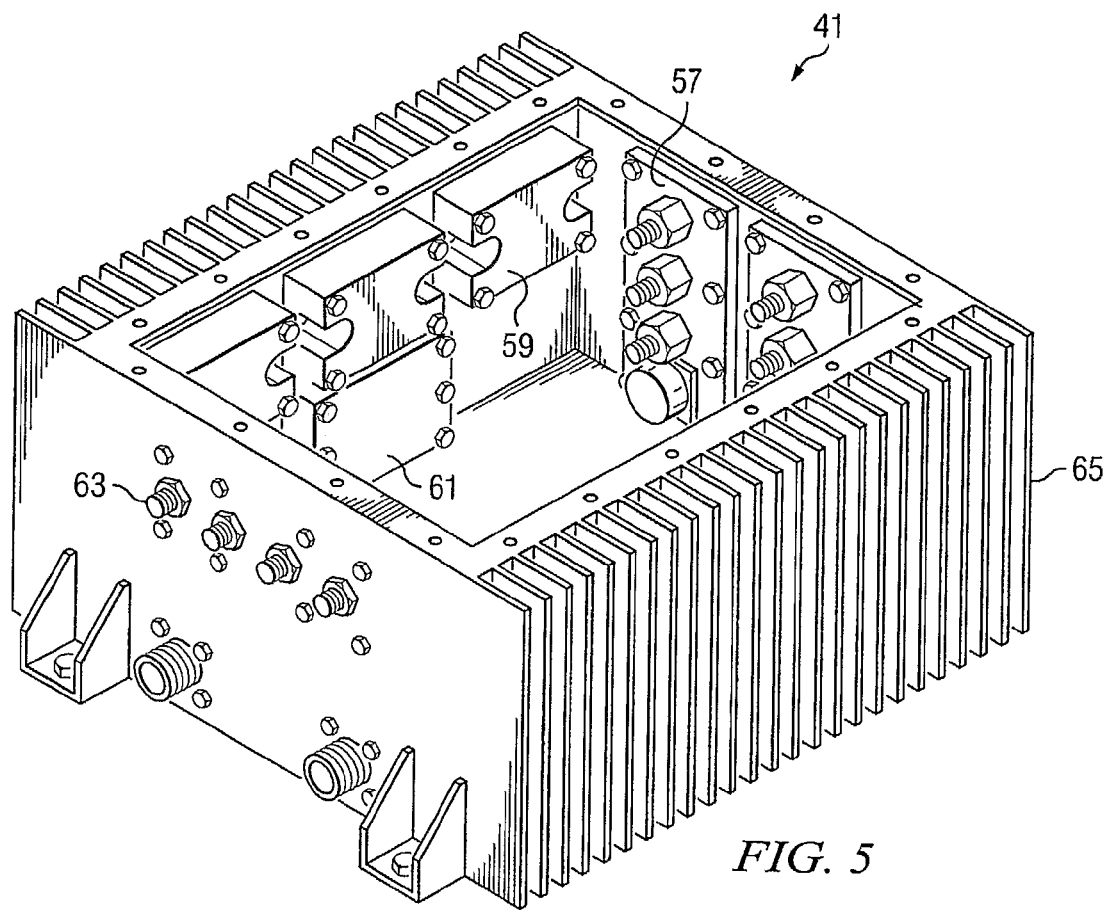
FIG. 5 is a perspective view of a lower de-ice distributor for use in the system according to the present invention.

FIG. 5 is a perspective view of LDD 41, an upper cover having been removed to allow viewing of the interior of LDD 41. LDD 41, like TAD 37, comprises two sets of internal components, and each of the electrical busses is conductively connected through input connectors 57 to one of the sets of internal components, each set being configured to convert and switch the electrical power from one of the busses. Each set of components comprises three solid-state relays 59, one for each phase, and a bridge rectifier 61 (preferably with no voltage step) for converting the 3-phase AC power to DC power. The DC power is then output from LDD 41 through output connectors 63, which are conductively connected to UDD 39 through a slip-ring on rotor 15. To minimize EMI and stress on components of system 27, relays 59 are preferably of a type that incorporates zero-cross switching. Switching of relays 59 is controlled by processor 29 or processor 31. Cooling fins 65 are located on the chassis of LDD 41 for dissipating the heat energy from the internal components.

Figure 6:
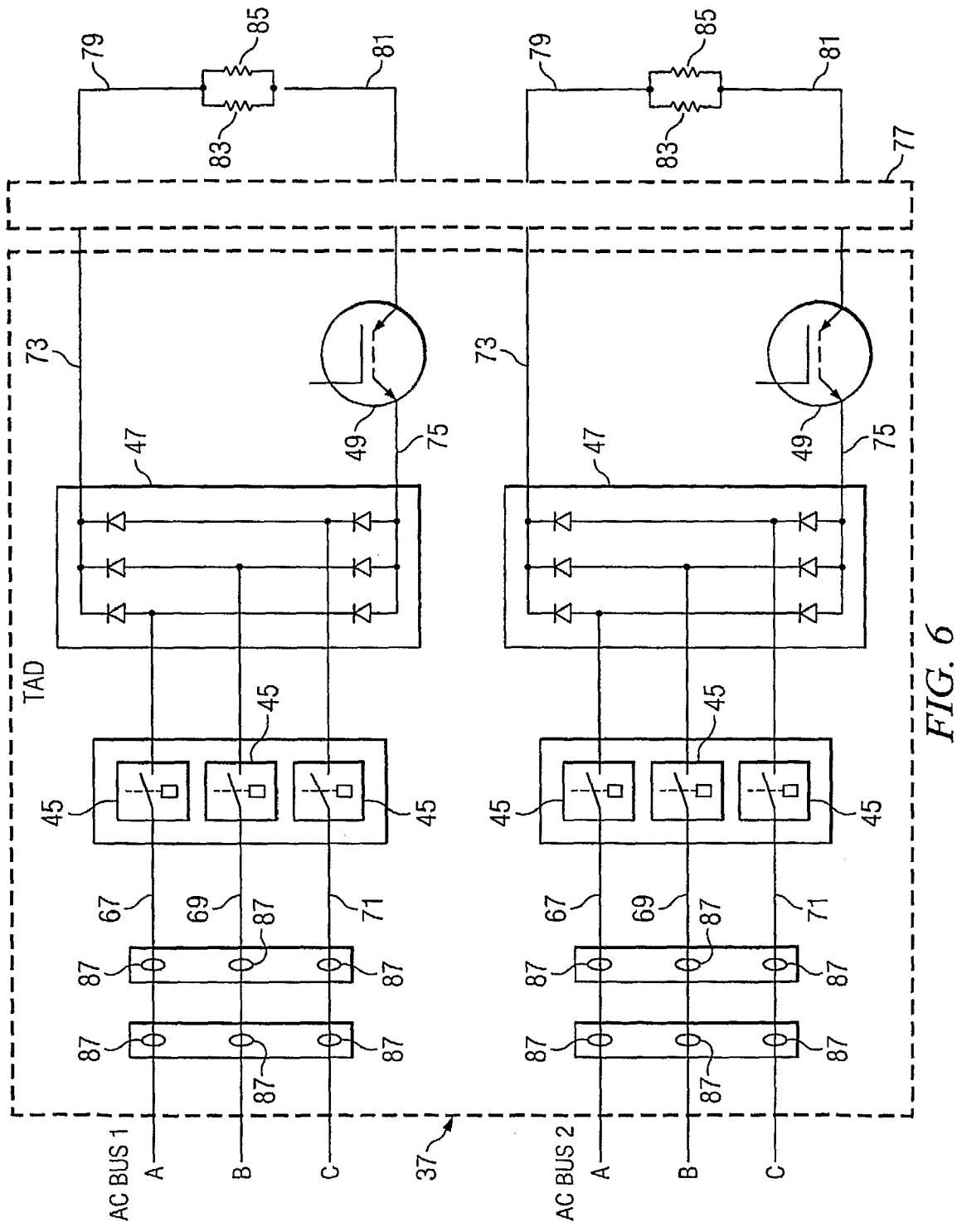
FIG. 6 is a schematic view of the tail-rotor anti-ice distributor of FIG. 3 and associated anti-ice devices.

FIG. 6 is a schematic view of the components within TAD 37 and their connections to the anti-ice device in blades 21 of tail rotor 19. FIG. 6 shows AC Bus 1 and AC Bus 2, each comprising a conductor 67, 69, 71 for each of the three phases, A, B, and C, respectively. Each bus is conductively connected to the AC power generation system (not shown) of helicopter 11, with each bus being nominally connected to one of a pair of AC generators. As described above, each bus is separately connected within TAD 37 to a bridge rectifier 49 through solid-state relays 45. Each relay 45 provides the ability to switch the power flow through one of conductors 67, 69, 71. The DC power output flowing from and returning to each rectifier 47 is carried through conductors 73, 75, which are connected through slip-ring 77 to conductors 79, 81, respectively, within tail rotor 19. Conductors 79, 81 are conductively coupled to heating elements 83, 85, each of which is located in one blade 21 of rotor 19. Switching of relays 45 controls power flow to heating elements 83, 85, and redundant switching is provided through the use of an IGBT 49 on each conductor 75 within TAD 37. Current transformers 87 provide a measure of the amount of current flowing through each conductor 67, 69, 71, one set of transformers 87 for a bus being connected to one processor 29, 31, the other set for a bus being connected to the other processor 29, 31. This configuration provides non-parasitic, independent measurements of current flowing through conductors 67, 69, 71 of each bus and allows both processors 29, 31 to determine if the current flow is within prescribed limits. Because IGBTs 49 are located within TAD 37, slip ring 77 requires only two high-power connections for each bus, one to connect each pair of associated conductors, i.e., conductor 73 to conductor 79 and conductor 75 to conductor 81.

In operation, 3-phase AC power is supplied through AC Bus 1 and AC Bus 2, each conductor 67, 69, 71 carrying one phase. When operation of heating elements 83, 85 is desired, the controlling processor 29, 31 first commands IGBTs 49 to switch "on" for allowing current flow through IGBTs 49. This is preferably done by sending a command signal to an optical isolator (not shown) for each IGBT 49, each isolator causing switching of the associated IGBT 49. The controlling processor 29, 31 then commands relays 45 to switch "on" for allowing current to flow through relays 45. By controlling the switching in this order, low EMI and emissions are achieved because the solid-state relays only switch on and switch off at the zero-crossing of the 3-phase AC sinusoids. Zero-cross switching also minimizes stress on slip-ring 77 and on the AC generators.

With relays 45 and IGBTs 49 switched "on," AC current is allowed to flow through each rectifier 47. The DC output power flows from rectifier 47 into conductor 73, through slip-ring 77, and through conductor 79 into heating elements 83, 85. The DC power returns to rectifier 47 through conductor 81, IGBT 49, slip-ring 77, and conductor 75. During operation, processors 29, 31 monitor the output of current transformers 87 to detect any deviation from expected values of current flow through conductors 67, 69, 71, which may indicate a fault in the system. The controlling processor 29, 31 stops the current flow to heating elements 83, 85 by first commanding relays 45 to switch "off," then commanding IGBTs 49 for the associated bus to switch "off." Alternatively, the output of optional temperature sensors (not shown) carried on blades 21 of rotor 19 may be used by the controlling processor 29, 31 to switch the devices for maintaining a desired temperature of the heated portions of rotor 19.

Figure 7:
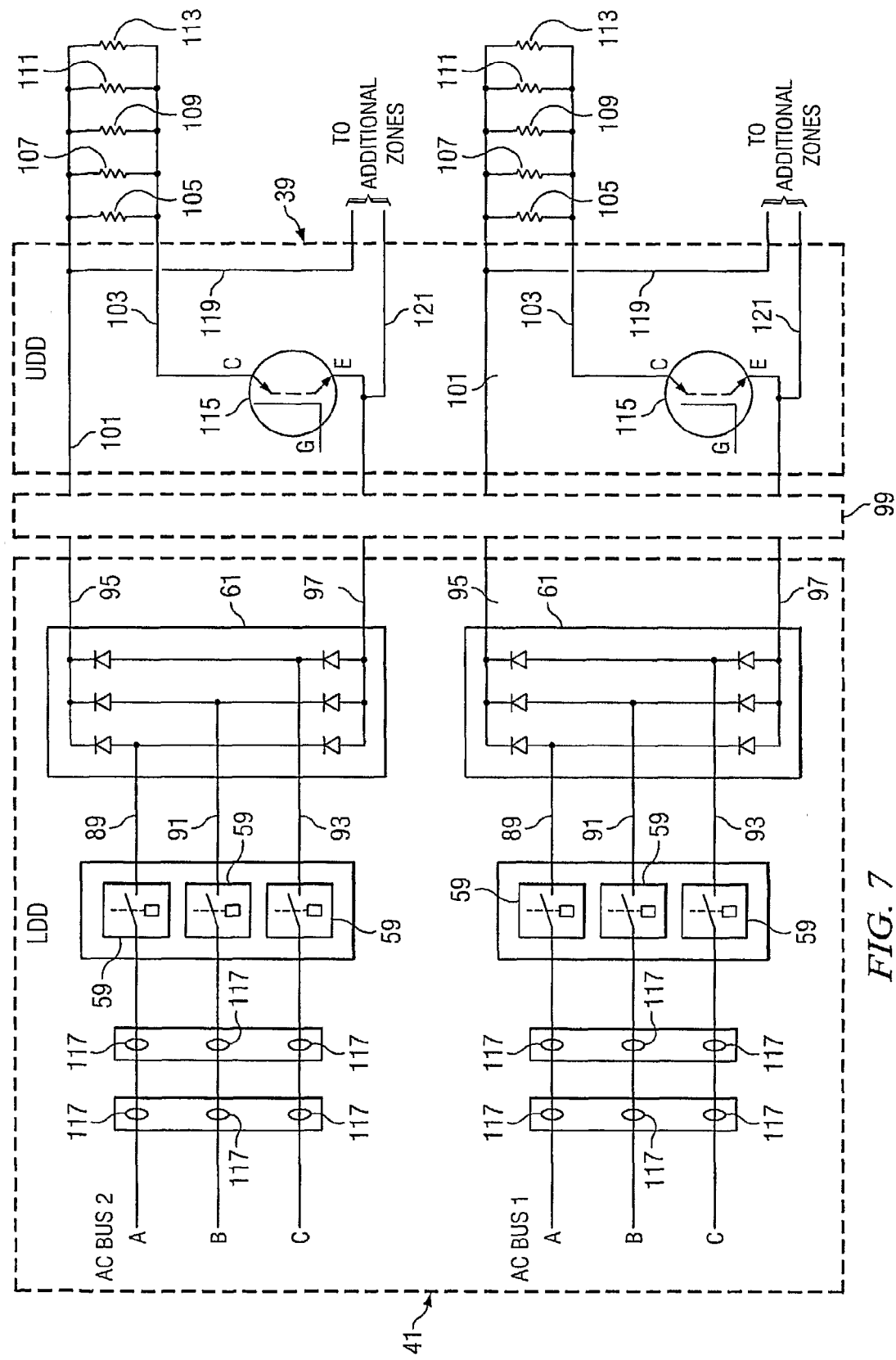
FIG. 7 is a schematic view of the lower de-ice distributor of FIG. 4, upper de-ice distributor of FIG. 5, and associated de-ice devices.

FIG. 7 is a schematic view of the components within LDD 41 and UDD 39 and their connections to the anti-ice device in blades 17 of main rotor 15. FIG. 7 shows AC Bus 1 and AC Bus 2, each comprising a conductor 89, 91, 93 for each of the three phases, A, B, and C, respectively. Each bus is conductively connected to the AC power generation system (not shown) of helicopter 11, with each bus being nominally connected to one of a pair of AC generators. As described above, each bus is separately connected within LDD 41 to a bridge rectifier 61 through solid-state relays 59. Each relay 59 provides the ability to switch the power flow through one of conductors 89, 91, 93. The DC power output flowing from and returning to each rectifier 61 is carried through conductors 95, 97, which are connected through slip-ring 99 to conductors 101, 103, respectively, within main rotor 15. Conductors 101, 103 are conductively coupled to heating elements 105, 107, 109, 111, 113, each of located in one blade 17 of rotor 19. Each set of heating elements 105, 107, 109, 111, 113 comprises a heating zone, and each bus is connected to multiple independently switched zones. In the preferred configuration, AC Bus 1 is conductively connected to non-critical heating zones, and AC Bus 2 is connected to critical heating zones. This division of zones between the busses provides an option of operating critical zones when the supply of AC power is below a desired value.

Switching of relays 59 controls power flow to heating elements 105, 107, 109, 111, 113, and redundant switching is provided through the use of an IGBT 115 on each conductor 103 within UDD 39. Current transformers 117 provide a measure of the amount of current flowing through each conductor 89, 91, 93, one set of transformers 117 for a bus being connected to one processor 29, 31, the other set for a bus being connected to the other processor 29, 31. This configuration provides non-parasitic, independent measurements of current flowing through conductors 89, 91, 93 of each bus and allows both processors 29, 31 to determine if the current flow is within prescribed limits. Conductors 119, 121 are conductively coupled to conductors 101, 103, respectively, and conduct DC power to additional heating zones coupled to the corresponding bus. Each additional zone has an IGBT 115 for providing switching control for the associated heating zone.

In operation, 3-phase AC power is supplied through AC Bus 1 and AC Bus 2, each conductor 89, 91, 93 carrying one phase. When operation of heating elements 105, 107, 109, 111, 113 for a particular zone is desired, the controlling processor 29, 31 first commands IGBT 115 for that zone to switch "on" for allowing current flow through IGBT 115. As in TAD 37, described above, this is preferably done by sending a command signal to an optical isolator (not shown) for each IGBT 115, each isolator being located in LDD 41 and causing switching of the associated IGBT 115. The controlling processor 29, 31 then commands relays 59 to switch "on" for allowing current to flow through relays 59. This order of switching results in low EMI and emissions and minimizes stress on slip-ring 99 and on the AC generators.

Slip ring 99 requires two high-power connections per bus, one to connect each pair of associated conductors, i.e., conductor 95 to conductor 101 and conductor 97 to conductor 103. Because IGBTs 115 are located in UDD 39, which is separated from LDD 41 by slip-ring 99, the signal from each isolator for switching the associated IGBT 115 must be conducted through slip-ring 99. However, use of a common ground within rotor 15 means that each zone requires only one slip-ring connection (not shown) to carry the command from the controlling processor 29, 31 to the isolator for each IGBT 115.

With relays 59 and selected IGBTs 115 switched "on," AC current is allowed to flow through each rectifier 61. The DC output power flows from rectifier 61 into conductor 95, through slip-ring 99, and through conductor 101 into heating elements 105, 107, 109, 111, 113. The DC power returns to rectifier 61 through conductor 103, IGBT 15, slip-ring 99, and conductor 97. During operation, processors 29, 31 monitor the output of current transformers 117 to detect any deviation from expected values of current flow through conductors 89, 91, 93, which may indicate a fault in the system. The controlling processor 29, 31 stops the current flow to heating elements 105, 107, 109, 111, 113 by first commanding relays 59 to switch "off," then commanding IGBTs 115 for the zone on the associated bus to switch "off."

Figure 8:
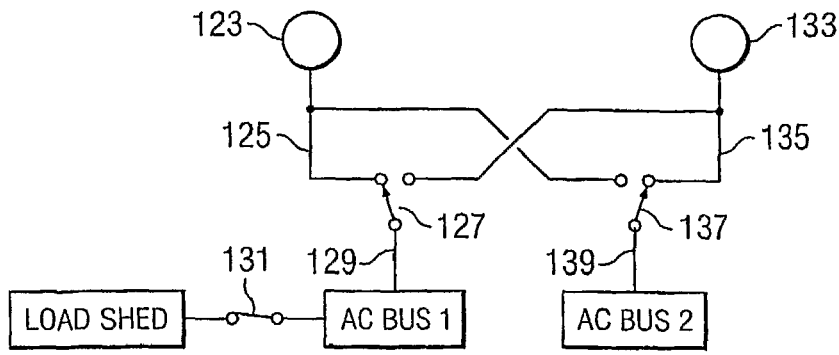
FIG. 8 is a schematic view of the alternating-current power distribution system of the system according to the present invention, the system being shown in a nominal configuration.
Figure 9:
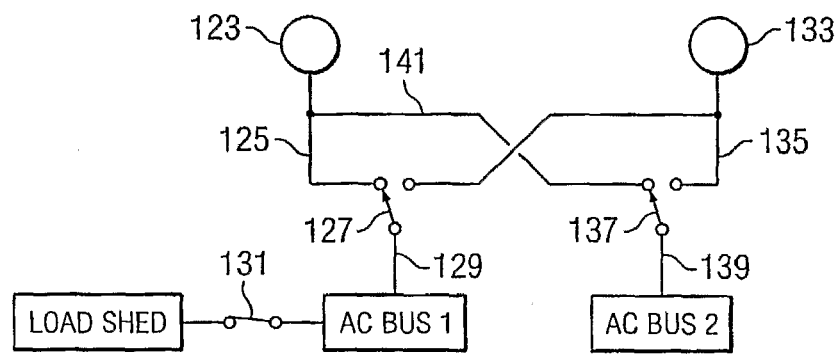
FIG. 9 is a schematic view of the alternating-current power distribution system of FIG. 8, the system being shown in a first optional fault configuration.
Figure 10:
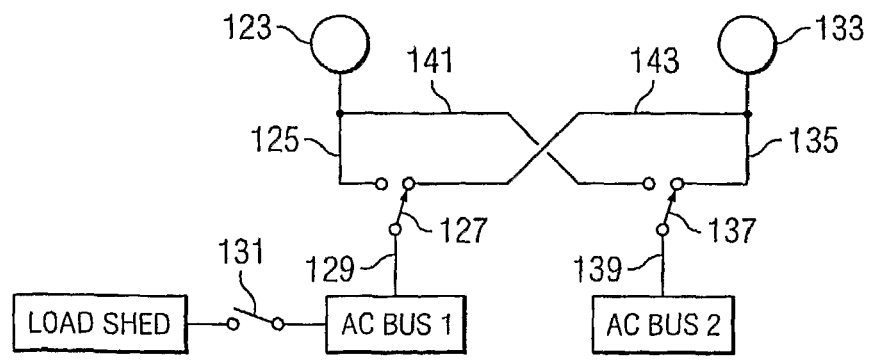
FIG. 10 is a schematic view of the alternating-current power distribution system of FIG. 8, the system being shown in a second optional fault configuration.

Referring now to FIGS. 8 through 10, the switching of the AC power distribution system is illustrated for a nominal configuration and two fault configurations. FIG. 8 shows the nominal configuration of the AC system, in which a high-output generator 123 is connected through conductor 125 and switch 127 to conductor 129. In the embodiment shown, AC Bus 1 is conductively connected to ice protection devices on two blades 21 of tail rotor 19 and on pilot windshield 25A. In addition, AC Bus 1 is conductively connected through a load-shed switch 131 to ice protection devices on the non-critical heating zones of rotor 15, copilot windshield 25B, and one ice detector set including one ice detector 33 and one controller 35. With switch 127 in the position shown, power may only flow from generator 123 to AC Bus 1 through conductor 125.

A low-output generator 133 is connected through conductor 135 and switch 137 to conductor 139. In the embodiment shown, AC Bus 2 is conductively connected to ice protection devices on the other two blades 21 of tail rotor 19 and on the critical heating zones of rotor 15. In addition, AC Bus 2 is conductively connected to the other ice detector set of ice detector 33 and controller 35. With switch 137 in the position shown, power may only flow from generator 133 to AC Bus 2 through conductor 135.

FIG. 9 shows a fault configuration in which low-output generator 133 has failed, requiring power to be supplied from high-output generator 123 to AC Bus 2. When generator 133 fails, switch 137 is commanded to move break contact with conductor 135 and switch to contact with conductor 141, which is conductively connected to generator 123. This configuration allows power from generator 123 to flow to both busses, providing power to the ice protection devices connected to AC Bus 1. This is especially important because the critical rotor zones are connected directly to AC Bus 2, and they receive no power until switch 137 is moved into contact with conductor 141. To reduce the electrical load on generator 123, selected non-critical ice protection devices may be turned off or cycled. In the embodiment shown, switch 131 remains switched "on," though the devices on co-pilot windshield 25B are turned off.

FIG. 10 shows a fault configuration in which high-output generator 123 has failed, requiring power to be supplied from low-output generator 133 to AC Bus 1. When generator 123 fails, switch 127 is commanded to move break contact with conductor 125 and switch to contact with conductor 143, which is conductively connected to generator 133. This configuration allows power from generator 133 to flow to both busses, providing power to the ice protection devices connected to AC Bus 1. This is especially important because the devices for pilot windshield 25A are connected directly to AC Bus 1, and they receive no power until switch 127 is moved into contact with conductor 143. To reduce the electrical load on generator 133, load-shed switch 131 is switched "off," disconnecting non-critical devices from the AC power system. Additionally, selected ice protection devices may be turned off or cycled. In the embodiment shown, the tail rotor devices are powered alternately to reduce the load on generator 133.

This system according to the invention has significant advantages. The system is very compact, inexpensive, and very lightweight. No bulky transformers are required, and no modifications to standard 3-phase AC generators are required. No DC generators are required and the required wire gage for this application is minimized. In addition, advantages include reduced complexity, a balanced 3-phase load, switching of the components with low levels of EMI, and increased reliability.

While this invention has been described with reference to an illustrative embodiment, this description is not intended to be construed in a limiting sense. Various modifications and other embodiments of the invention will be apparent to persons skilled in the art upon reference to the description.

The invention claimed is:

1. An ice management system for an aircraft having at least one rotor, each rotor having a plurality of blades, the system comprising:
   an alternating-current (AC) electrical power supply for supplying AC power, the AC power supply being adapted to be carried by the aircraft remote from the rotor;
   a converter for converting the AC power to direct-current (DC) power;
   a solid-state relay AC switch for controlling the flow of AC power to the converter, the solid-state relay being adapted to activate only during a zero crossing of an AC waveform;
   at least one ice protection device carried by the rotor and operated using the DC power;
   a distributor carried by the rotor for distributing the DC power to the at least one ice protection device;
   a solid-state DC switch for controlling the flow of DC power to the at least one ice protection device; and
   a detector for detecting icing conditions during flight, the detector being operably associated with a processor, the processor being adapted to selectively activate the solid-state DC switch, thereby allowing the flow of DC power to the at least one ice protection device affected by icing conditions.

2. The ice management system according to claim 1, wherein the DC switch is an insulated-gate bipolar transistor.

3. The ice management system according to claim 1, further comprising:

an AC switch for controlling the flow of AC power to the converter, the AC switch being located remote from the rotor; and a DC switch for controlling the flow of DC power to the at least one ice protection device, the DC switch being located on the rotor.

4. The ice management system according to claim 1, further comprising:

a slip-ring connector for conducting the DC power from the converter into the rotor.

5. The ice management system according to claim 1, wherein the converter is a bridge rectifier.

6. An aircraft, comprising:

at least one rotor, each rotor having a plurality of blades;

an alternating-current (AC) electrical power supply for supplying AC power, the AC power supply being carried remote from the rotor;

a converter for converting the AC power to direct-current (DC) power;

a solid-state relay AC switch for controlling the flow of AC power to the converter, the solid-state relay being adapted to activate only during a zero crossing of an AC waveform:

at least one ice protection device carried by the rotor and operated using the DC power;

a distributor carried by the rotor for distributing the DC power to the at least one ice protection device;

a solid-state DC switch for controlling the flow of DC power to the at least one ice protection device; and a detector for detecting icing conditions during flight, the detector being operably associated with a processor, the processor being adapted to selectively activate the solid-state DC switch, thereby allowing the flow of DC power to the at least one ice protection device affected by icing conditions.

7. The aircraft according to claim 6, wherein the DC switch is an insulated-gate bipolar transistor.

8. The aircraft according to claim 6, further comprising:

an AC switch for controlling the flow of AC power to the converter, the AC switch being located remote from the rotor; and a DC switch for controlling the flow of DC power to the at least one ice protection device, the DC switch being located on the rotor.

9. The aircraft according to claim 6, further comprising:

a slip-ring connector for conducting the DC power from the converter into the rotor.

10. The ice management system according to claim 6, wherein the converter is a bridge rectifier.

11. A method of operating ice protection devices on a rotor of an aircraft, the method comprising:

supplying alternating-current (AC) electrical power to a converter;

converting the AC power to direct-current (DC) electrical power; and supplying the DC power to at least one ice protection device located on the rotor, controlling the flow of AC power to the converter a solid-state relay AC switch;

activating the solid-state relay during a zero crossing of an AC waveform;

at least one ice protection device carried by the rotor and operated using the DC power;

distributing the DC power a distributor carried by the rotor to the at least one ice protection device;

controlling the flow of DC power to the at least one ice protection device with a solid-state DC switch; and detecting icing conditions during flight with a detector, the detector being operably associated with a processor; and selectively activating the solid-state DC switch with the processor, thereby allowing the flow of DC power to the at least one ice protection device affected by icing conditions.

12. The method according to claim 11, wherein the step of supplying AC power comprises supplying AC power from one of at least two independent AC sources.

13. The method according to claim 12, further comprising:

selectively switching to another of the sources of AC power.

* * * * *